(12) United States Patent
Dibelardino (10) Patent No.: US 7,997,720 B1
(45) Date of Patent: Aug. 16, 2011

(54) EYESHADE WITH HORIZONTALLY ADJUSTABLE STOPS

(75) Inventor: Aldo Dibelardino, Virginia Beach, VA (US)

(73) Assignee: Aldo Dibelardino, Virginia Beach, VA (US)

( * ) Notice: Subject to any disclaimer, the term of this patent is extended or adjusted under 35 U.S.C. 154(b) by 0 days.

(21) Appl. No.: 12/761,094

(22) Filed: Apr. 15, 2010

(51) Int. Cl.
*G02C 7/10* (2006.01)
(52) U.S. Cl. ............ 351/44; 351/63; 351/106; 351/107; 351/158
(58) Field of Classification Search .................... 351/41, 351/44, 63, 103–109, 155, 156, 158; 2/452–454
See application file for complete search history.

(56) References Cited

U.S. PATENT DOCUMENTS

| | | | |
|---|---|---|---|
| 1,868,362 A | 7/1932 | Nowak | |
| 2,342,982 A | 2/1944 | Stern et al. | |
| 3,233,249 A * | 2/1966 | Baratelli et al. | 2/443 |
| 5,297,298 A | 3/1994 | Salatka et al. | |
| 5,367,344 A * | 11/1994 | Fuchs | 351/41 |
| 5,835,182 A | 11/1998 | Einarsson | |
| 2002/0140898 A1 | 10/2002 | Wu | |

* cited by examiner

*Primary Examiner* — Huy K Mai
(74) *Attorney, Agent, or Firm* — Hunton & Williams LLP (57) ABSTRACT

The present invention relates to an eyeshade apparatus having a band, a lens, lens punchouts, and adjustable stops. Its design allows the curvature of the lens of the eyeshade to be modifiable for different activities and uses. The eyeshade apparatus, also because of its design, is nearly indestructible in its non-use position as it lies virtually flat.

16 Claims, 7 Drawing Sheets

EYESHADE WITH HORIZONTALLY ADJUSTABLE STOPS

BACKGROUND

The use of eyeshades, such as sunglasses, is important. In fact, it has been recommended that anytime a person will be exposed to UV radiation, sunglasses be used to avoid harmful effects. Unfortunately, diverse activities may require multiple eyeshades, with each type specifically tailored to the activity being performed (e.g., work versus an exercise activity). Multiple shades are needed because most eyeshades are static and incapable of adjusting for use in more than one activity. Purchase of multiple eyeshades has a negative environmental impact, as more resources are required and consumed.

Eyeshades are seldom personalizable (i.e., capable of being customized to a person's facial contours). Rather, most shades are produced from a single mold. Buyers of these mold-designed shades suffer discomfort as the "one size fits all" maxim proves to be untrue.

SUMMARY OF THE INVENTION

The present invention relates to an eyeshade that is capable of being used in more than one activity, primarily because it is dynamic in its ability to adjust from a more relaxed, fashionable position to a more compact, "physical activity" position. Further, the present invention is completely customizable. The dynamic nature of the eyeshade is created by adjustable stops positioned along the frame (i.e., the band of the eyeshade), so that they abut the lens of the eyeshade to either bring the edges of the lens closer to the temples of the user, or move the edges of the lens away from the temples. This has the effect of giving the lens more curvature (bringing the edges closer) or less curvature (moving the edges away). The adjustable stops operate by moving along the horizontal (i.e., the "x axis" of the band). The dynamic nature both allows the eyeshade to better fit the user's face and to adjust to match the needs of the user's varied activities. And while these adjustable stops are required to achieve maximum customization of the invention, one embodiment of the invention excludes these stops in which the frame merely passes through punchouts in the lens.

Another objective of the present invention is that of requiring less material than is used in current eyeshade models. Further, the present invention is nearly indestructible due to its flat design, capable of being shipped in flat packaging, and having an extendable life due its indestructible nature and capability of being modified.

The present invention has a customizable structure that can be specifically tailored for each user, which overcomes many disadvantages found in the prior art. The lens of the sunglasses can be adjusted for flexible covering of the eyes. Due to the invention's light weight (i.e., low mass) and customizable nature, the eyeshades fit much more securely on the users' head and are less prone to fall off during exertion.

As a person with ordinary skill in the art will realize, the term "eyeshade" refers to an apparatus having a lens vertically extending generally from just above the eyebrows to the user's cheekbone and horizontally extending from temple to temple, whereby the lens is made of a flexible material and can be transparent or semi-transparent. "Eyeshade" includes sunglasses, eye shields, eye glasses, and other eye wear.

The term "adjustable" as used herein refers to the ability of an element to move in response to a force upon it, whether the force be active, such as at the direction of a person, or passive, such as exerted by energy to reduce stress of the band. The element has the ability to move more than once, in both a positive direction and a negative direction.

DETAILED DESCRIPTION OF THE INVENTION

Figure 1:
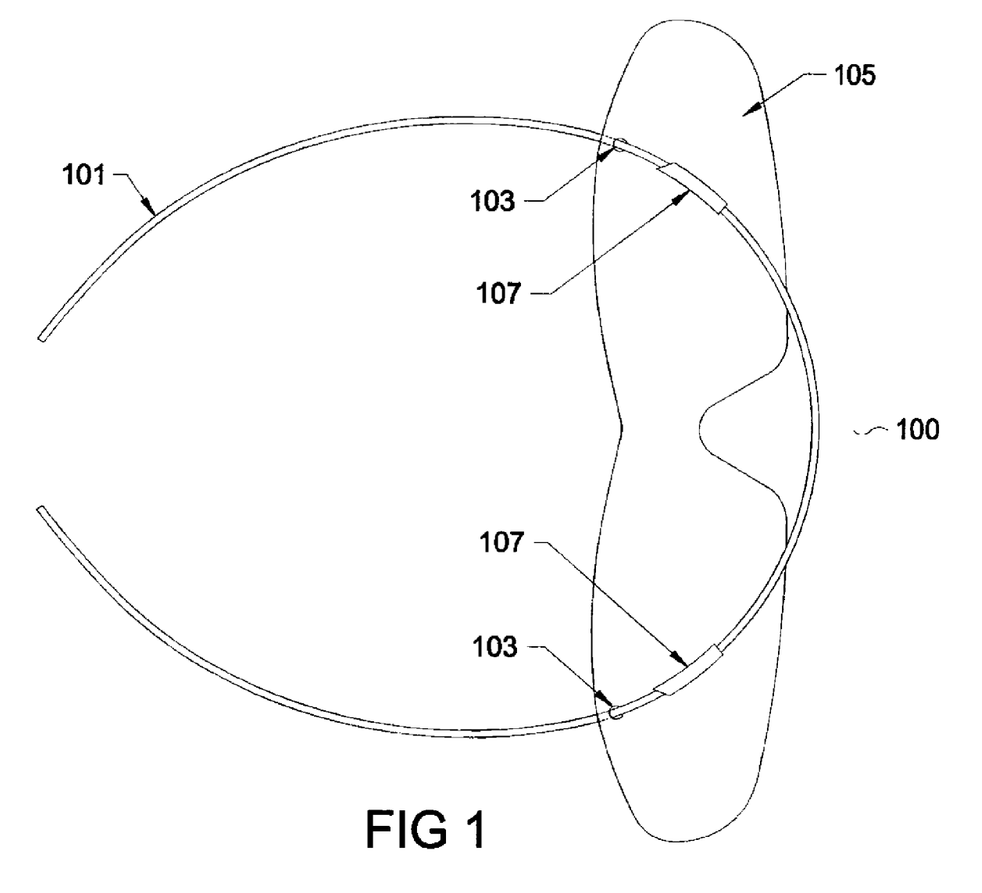
FIG. 1 is an embodiment of the eyeshade apparatus of the present invention, whereby the eyeshade is in a non-use or storing position.

FIG. 1 is an eyeshade apparatus 100 of the present invention, including a band 101, a lens 105, lens punchouts 103 that allow the lens 105 to engage the band 101, and adjustable stops 107 inserted on the band capable of movement along the band 101 for customizing the lens's 105 fit over a user's eyes and around the head. The eyeshade 100 as shown in FIG. 1 is in its non-use or storing position, referring to the position in which the eyeshade is folded.

The band 101 is preferably semi-circular in shape, for engaging the sides and back of a user's head. The band possesses a horizontal axis and a vertical axis. In its semi-circle shape, the band 101 avoids contact with sensitive areas on the user's head (e.g., on the bridge of the nose and behind the ears). Because the present invention primarily contacts the user's head above the eyebrows and at the back of the head (i.e., it is unnecessary for it to even contact the nose), the user experiences much greater operational comfort.

Based on the semi-circular shape of the band 101, it may be produced with less material and may be thinner. This results in a band 101 that is both light-weight and physically stable. Further, the invention's design eliminates "stress points" found in traditional eyeglass designs. These "stress points" (e.g., the hinges) become common failure points. Because the current invention eliminates these "stress points," it is much more durable that traditional eyeglasses.

The diameter of the band 101 can vary depending on the dimensions of the user's head. For example, a band for a child's head should be rather small (e.g., around 3.5 inches in diameter), whereas a band for an adult's head should be around 5.5 inches in diameter.

The thickness of the band 101 can range from 0.016 inches to 1 inch. The band 101, in its thickness, should be sufficient to allow it to maintain its shape over the life of the eyeshade 100. The material used in the band 101 may dictate its thickness.

The material for the band 101 can be selected based on a variety of factors, including, but not limited to, the end use of the eyeshade (e.g., use of the eyeshade in a medical environment), use of the eyeshade in athletic activity, use of the eyeshade in an educational environment (such as schools, etc.), the desired thickness of the band, the skin condition of the user (who may be allergic to certain materials), a desire to utilize compositions that provide a lower carbon footprint (i.e., "green" compositions, etc.). The material may be pure (e.g., silver, gold, platinum, etc.) or a composite (such as an alloy). The material may also be a polymer. Examples of compositions suitable for the band include, but are not limited to, steel, titanium, aluminum, and plastics.

Figure 2:
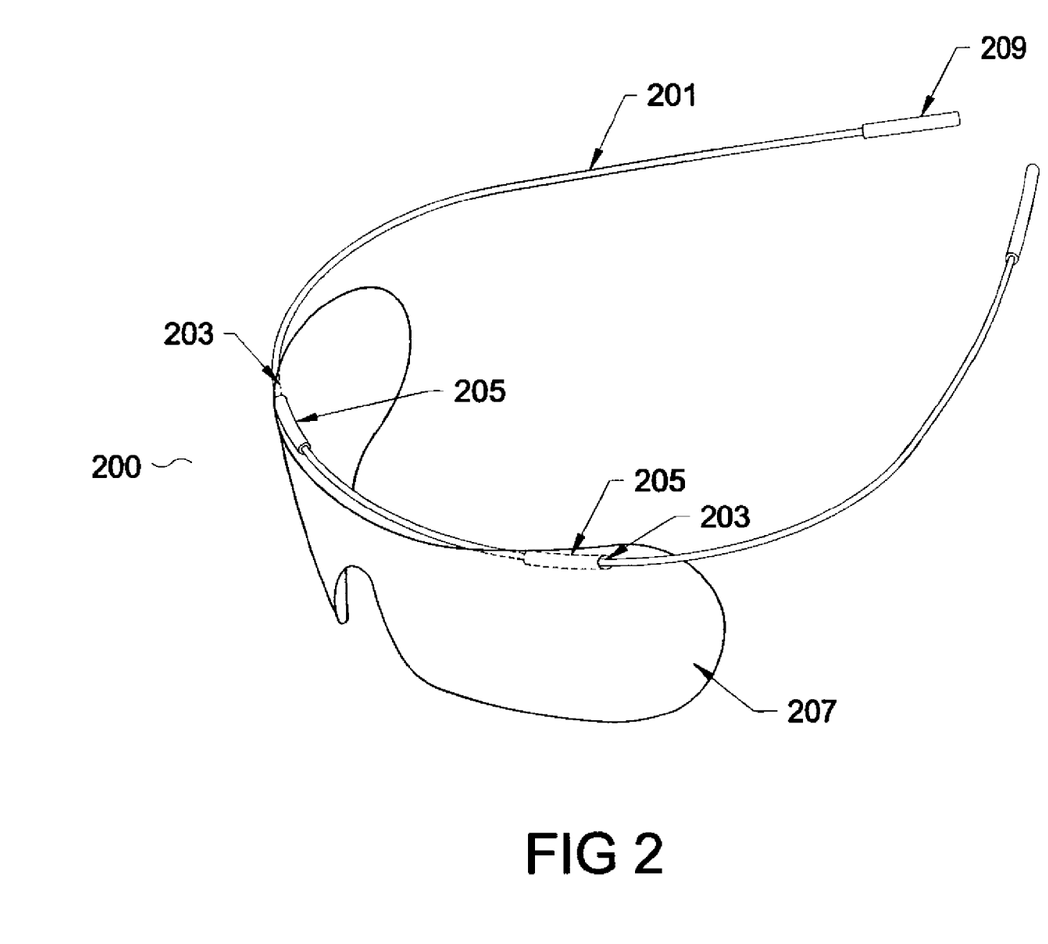
FIG. 2 is an embodiment of the eyeshade of the present invention, whereby the eyeshade is in a use position.
Figure 2A:
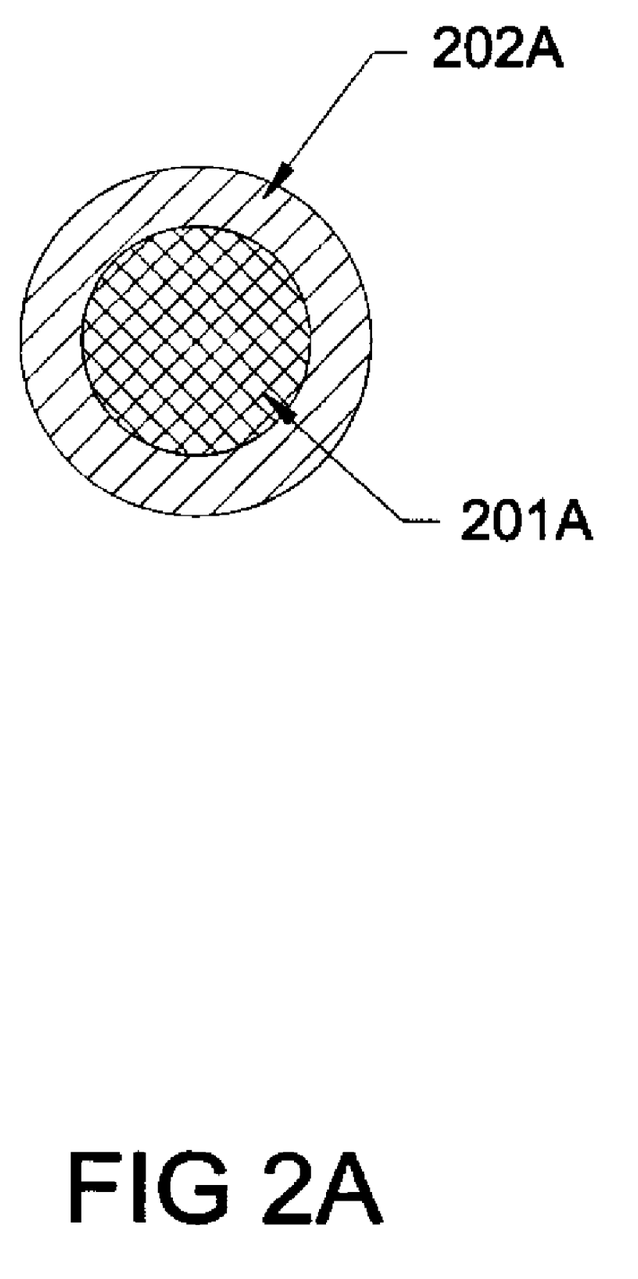
FIG. 2A exhibits an embodiment of the wire frame or band of the eyeshade made with Alumanium™.

In one embodiment of the invention, as shown in FIG. 2A, the band or frame is made of Alumanium™, which is an aluminum wire that has been anodized. While aluminum is most often anodized to either resist corrosion or to add a color coating, in this invention the aluminum center wire 201A has an anodized outer layer 202A that also ensures that the frame maintains its desired shape. Thus, with Alumanium™, the frame includes spring-like characteristics, allowing it to adapt to the user's head without breaching the frame's integrity.

The shape of the band 101, with regard to its thickness, may be circular, or another shape such as box-like, octagonal, hexagonal, etc. And while in the preferred embodiment of the invention, a lens 105 hangs from the band 101, because the band 101 contacts the user's head above the eyebrows in a spring-like manner, in other embodiments, other functional or ornamental devices may be hung from the band 101 (e.g., a small microphone, a thin computer screen, ear devices, etc.).

In an alternative embodiment, the band 101 includes tabs (not shown) at its end points (i.e., the points that do not meet). The tabs can be suitable for adding comfort to the user's head. The tabs can be made of materials such as foam, polymeric material, and the like.

In this present invention, the lens 105 is made of one continuous piece. The lens 105 is easily changeable by the user. Further, multiple lenses 105 may be used in a layered fashion.

The lens 105 should sufficiently cover a user's eyes based on the desired use of the eyeshade 100 (e.g., medical use, aviator use, fashionable use, etc.). The color of the lens 105 may be based on the user's preference or the intended use of the eyeshade. For example, the color can be gray or green to maintain a true color, brown to cause color distortion, turquoise for medium and high light conditions, orange or yellow to cause contrast and depth perception, or blue or purple for cosmetic purposes. The lens can also be clear, for example, for use in a medical environment. In one embodiment, the lens complies with one or more international standard, such as AS/NZ 1067:2003, EN 1836:2005, and ANSI Z80.3-2008.

Lens selection can also be based on categorical use, such as fashion, UV radiation protection and limited reduction (but not for driving at night), general use providing good protection from UV radiation and sunglare, extra protection from UV radiation and sunglare, and high level of protection from UV radiation and sunglare.

The lens 105 thickness can be adapted to the desired level of protection for the user's eyes. In one embodiment, the thickness can be as little as 0.0127 millimeter. Regardless of the thickness of the lens 105, the lens 105 should maintain flexibility, allowing it to be altered in response to the adjustable stops 107.

The lens 105 shape can be modified by the user based on the end use of the eyeshade. For example, the lens can be larger if its intended use will be in a medical environment or cut smaller to give a "cool" factor if its intended use will be for fashionable purposes. In one embodiment, patterns are provided with which to re-design the lens shape.

The lens 105 can be made of plastic, for example, acrylic, polycarbonate, CR-39, or polyurethane. The lens 105 may also contain one or more coatings allowing the lens to be protected against scratching. In embodiments of the invention in which the lens is thicker, the lens may also be flipped up, allowing the eyeshade to be worn as a visor. In another embodiment, the lens contains an eye prescription.

The lens 105 possesses at least 2 punchouts 103 allowing it to engage with the band 101. The punchouts 103 should be of a diameter that allows free, tight movement along the band 101, allowing the lens 105 to be completely removed from the band 101, while at the same time being smaller than the outer diameter of the adjustable stops 107. The punchouts 103 should be designed in a shape matching that of the band 101. In one embodiment, users are able to create the punchouts using, for example, a hole puncher (not shown). The position of the punchouts 103 in FIG. 1 are for illustrative purposes only and punchouts may be positioned anywhere along the lens 105.

The adjustable stops 107 of the eyeshade 100 are capable of allowing the lens 105 to be compacted or expanded to meet the desires or needs of the user, or to match the contours of the user's face. The band 101 is inserted through the adjustable stops 107 to move freely thereon. The inner diameter of the adjustable stops 107, prior to placement over the band 101, should preferably be slightly smaller than that of the band 101, for example from 0.001 mm to 0.01 mm smaller. In use, the adjustable stops 107 are positioned by the user or move freely in response to the activity of the user. For example, if the user is engaged in a physically straining activity, the contours of his face may change. But despite this change, the flexible lens material allows the lens to continue to sufficiently engage and protect the eyes of the user.

The adjustable stops 107 are cut at an angle to increase control over the curvature of the lens 105. For example, when the stops 107 are rotated on the band 101, the angle cut on the stops 107 will engage the lens 105 at a different orientation, creating a varying effect on the lens 105. Due to the flexible nature of the invention, the lens 105 may be customized to fit an asymmetrical face. The stops 107 can be made of a variety of materials, including, but not limited to, plastics, foam, alloys, rubber or pure metals. In another embodiment of the invention, the stops can be made of adhesive materials or fixed stops or stops made via crimping of the wire frame, etc. As one of ordinary skill in the art will readily appreciate, the functionality of these stops may be accomplished through numerous embodiments.

FIG. 2 is an embodiment of the eyeshade 100 of the present invention, including a band 201, lens 207, punchouts 203, and adjustable stops 205. In this embodiment, head contact pads 209 are shown. This embodiment shows the eyeshade 200 in its ready-to-use position.

As shown in this embodiment, the adjustable stops 205 are adjacent to the punchouts 203. In this manner, through their ability to move along the band 201, they are able to change the curvature of the lens 207. This point will be discussed in more detail below.

Figure 3:
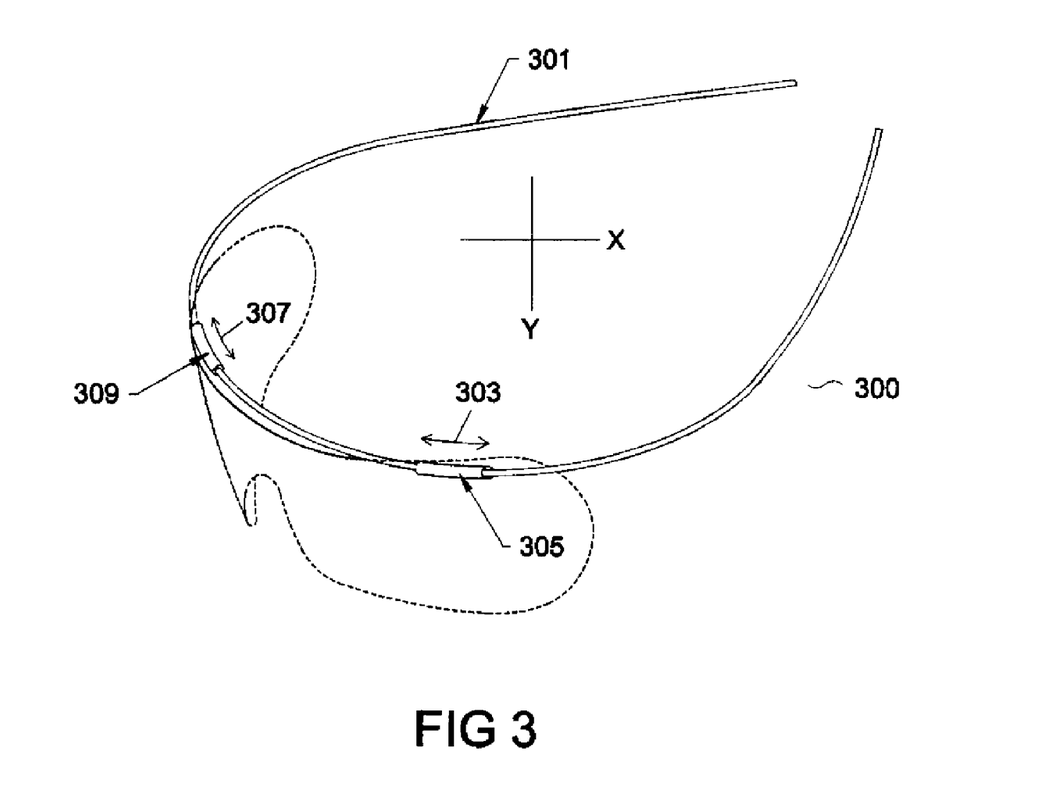
FIG. 3 exhibits the adjustable stops used in the eyeshade.

FIG. 3 exhibits the eyeshade 300 of the present invention. The adjustable stops 305/309 are capable of moving along the band 301 in a horizontal manner, i.e., along the "x axis" of the band 301 or movement parallel to the band 301. The adjustable stops 305/309 are capable of moving in a positive or negative direction 303/307. In one embodiment, the adjustable stops 305/309 move in tandem with one another (i.e., as one moves in a positive direction, the other moves in an equal negative direction). In another embodiment, the adjustable stops 305/309 move independently of one another.

It is important to note that the adjustable stops as used in the present invention do not serve to attach the lens to the band of the eyeshade. Rather, they are used to reposition the lens, either closer to or away from the user's temples, as it is positioned over the eyes. Movement drawing the lens closer to the temples may be suitable for more fully covering the eyes up to the corners (i.e., less exposure to light and airborne particles). Movement drawing the lens away from the temples may be suitable for less covering up of the eyes. By not being used to connect the lens to the band, the adjustable stops are able to freely move on the horizontal axis of the band.

Figure 4:
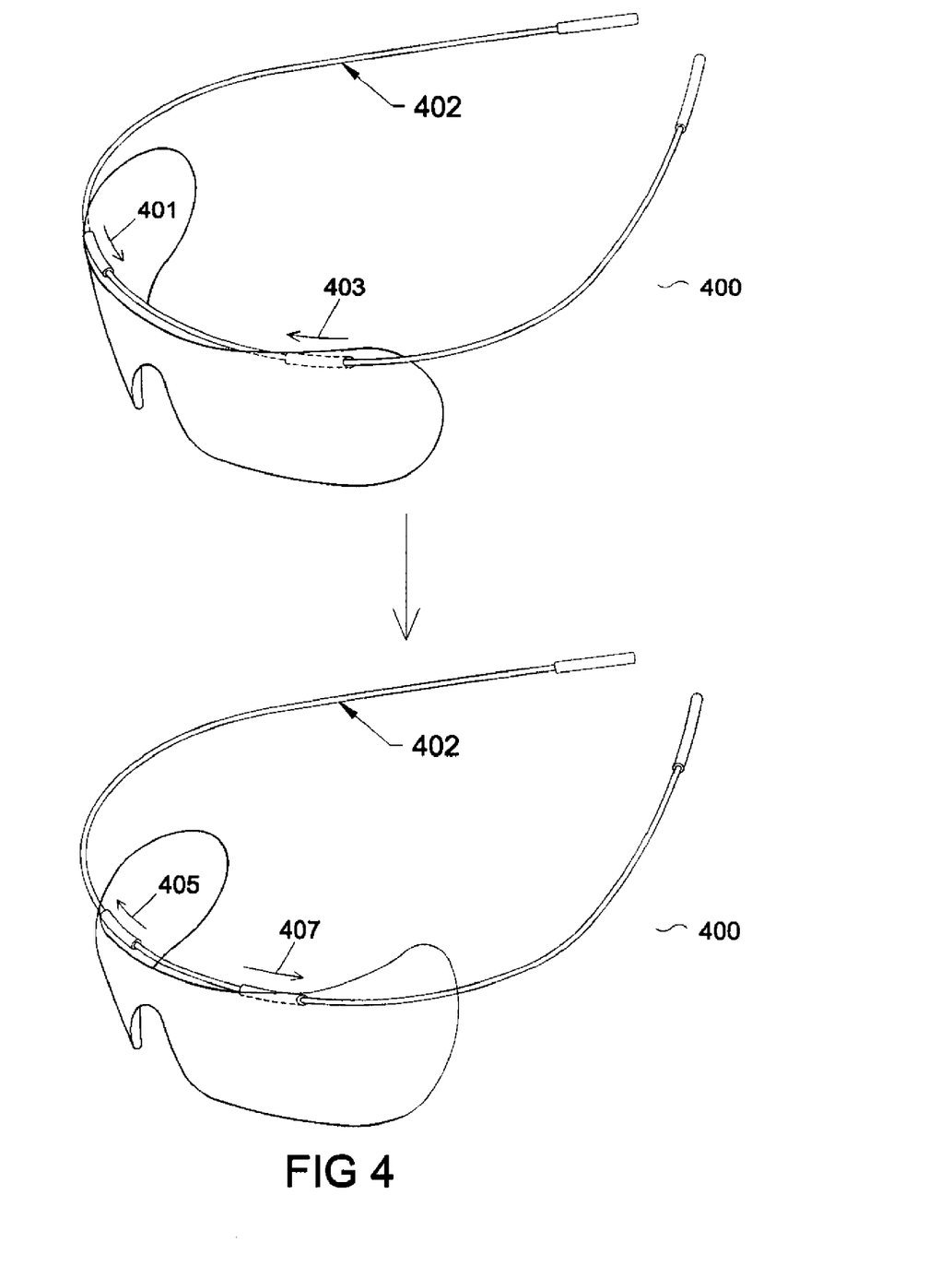
FIG. 4 exhibits the method by which the adjustable stops of the eyeshade act to compact or expand the curvature of the lens.

FIG. 4 is an embodiment showing the lens of the eyeshade 400 of the present invention being modified by the adjustable stops. As shown, the adjustable stops are in one position 401/403. Either by the user of the eyeshade or in response to changing conditions, the adjustable stops are moved 405/407 along the band 402 of the eyeshade 400 in a horizontal manner.

The effect of movement of the adjustable stops along the horizontal (i.e., the "x axis"), is the expansion or compacting of the lens.

Figure 5:
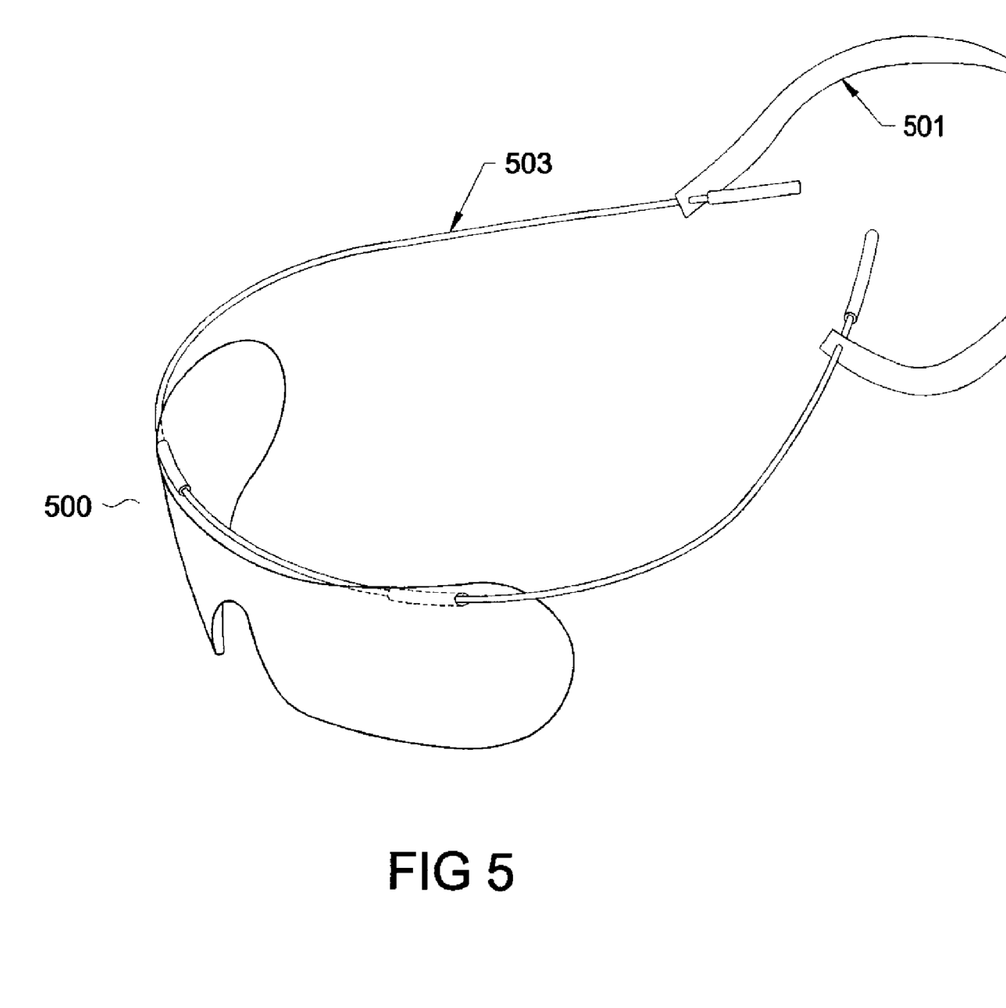
FIG. 5 is an embodiment of the eyeshade, further including a strap.

FIG. 5 is a further embodiment of the invention, whereby a strap 501 is used to allow more secure attachment of the eyeshade 503 to the head of the user. The strap 501 may be made of a material that is buoyant in water, which will prevent the eyeshades from sinking should they fall off the user's head while engaged in, for example, a maritime activity.

Figure 6:
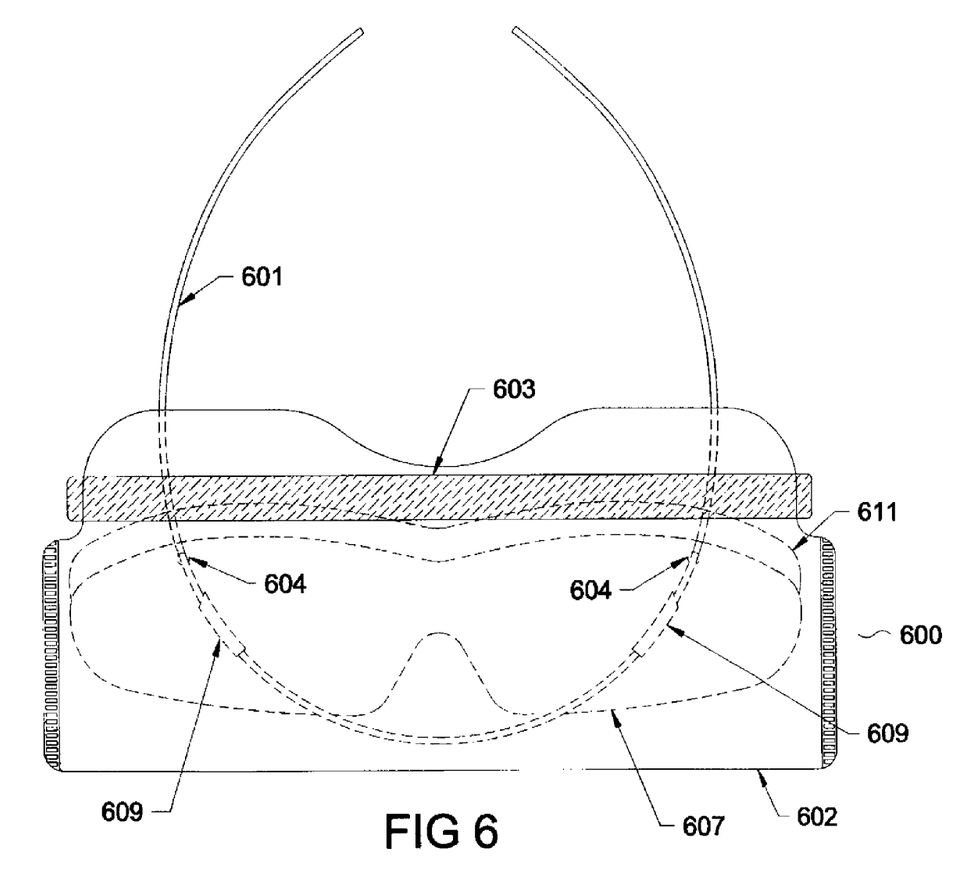
FIG. 6 is a kit containing the eyeshade, utilized for transporting the eyeshade.

FIG. 6 is an embodiment of a kit 600 of the present invention, including a pouch 602, an eyeshade made of a band 601, a lens 607, punchouts 604, and adjustable stops 609, a strap 603, and one or more additional lenses 611.

In this embodiment, due to the capability of the eyeshade to lie flat when in use, the entire kit 600 is substantially flat from 0.1 inch in thickness upward.

Because the lens 607 of the eyeshade may be removed from the eyeshade apparatus, it is possible to install other lenses thereon for other purposes. Thus, the kit 600 include sufficient space for two or more lenses.

Significantly, the dimensions of the kit 600 allow it to be mailed in a standard, flat mailing envelope, thus decreasing mailing expense.

Having described embodiments of the present invention with reference to the accompanying drawings, it is to be understood that the present invention is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements; and c) any reference signs in the claims do not limit their scope.

I claim:

1. An eyeshade apparatus comprising,
    a band having a horizontal axis, a vertical axis, and end points;
    a lens attached to said band via at least two punchouts on said lens, whereby said band is inserted through said punchouts; and
    at least two adjustable stops inserted on said band and positioned adjacent to said punchouts,
    whereby said adjustable stops are movable along the horizontal axis of said band.

2. The eyeshade apparatus of claim 1, further comprising tabs positioned on the end points of said band.

3. The eyeshade apparatus of claim 1, further comprising a strap positioned onto the end points of said band.

4. The eyeshade apparatus of claim 1, wherein said adjustable stops, prior to placement over said band, have an inner diameter from about 0.001 mm to 0.01 mm smaller than the diameter of said band.

5. The eyeshade apparatus of claim 1, wherein said band is semi-circular in shape.

6. The eyeshade apparatus of claim 1, wherein said band is made of a material selected from the group consisting of steel, titanium, aluminum and plastics.

7. The eyeshade apparatus of claim 1, wherein said band is made of Alumanium™.

8. The eyeshade apparatus of claim 1 wherein the diameter of said band is at least 0.016 inch.

9. The eyeshade apparatus of claim 1, wherein said lens is a customized shape designed by a user.

10. The eyeshade apparatus of claim 1, wherein said apparatus lays flat in its non-use position.

11. A method of adjusting the curvature of an eyeshade, comprising the steps of:
    moving one adjustable stop positioned on a band having a horizontal axis and a vertical axis, from one position to another along the horizontal axis of said band; and
    changing the curvature of a lens attached to said band,
    whereby said lens includes at least one punchout adjacent to said adjustable stop.

12. The method of adjusting the curvature of the lens of an eyeshade of claim 11, further comprising the step, prior to the step of changing the curvature of a lens, of moving a second adjustable stop positioned on said band from one position to another along the horizontal axis of said band.

13. An eyeshade kit comprising,
    a pouch;
    an eyeshade inserted in said pouch, having a band with a horizontal axis and a vertical axis, a lens attached to said band via at least two punchouts on said lens, whereby said band is inserted through said punchouts, and at least two adjustable stops inserted on said band and positioned adjacent to said punchouts, whereby said adjustable stops are movable along the horizontal axis of said band;
    a strap; and
    one or more additional lenses.

14. The eyeshade kit of claim 13, wherein said kit is at least 0.05 inch in thickness.

15. The eyeshade kit of claim 13, wherein said pouch is transparent.

16. The eyeshade kit of claim 13, further comprising a hole puncher.

* * * * *